Dec. 2, 1941.   C. M. HACKLEY   2,264,876

WATER SUPPLY SYSTEM

Filed June 19, 1939

INVENTOR.
C. M. Hackley
BY
A. E. Fisher
ATTORNEY.

Patented Dec. 2, 1941

2,264,876

UNITED STATES PATENT OFFICE 2,264,876

WATER SUPPLY SYSTEM

Cecelia M. Hackley, Trilla, Ill.

Application June 19, 1939, Serial No. 279,844

1 Claim. (Cl. 137—79)

This invention pertains to water supply systems and equipment for furnishing hot, cold or warm water for general use, as in homes, stores, offices and hospitals, or wherever required.

The main object of the invention is to provide in combination hand operated means for supplying hot or cold water to a wash bowl, sink or bath-tub, or the like, and foot operated means for steadily supplying water of any predetermined intermediate temperature.

Another object is to provide in combination with conventional valve controlled pipes and faucets for suplying hot and cold water to a wash-bowl or tub, a cross-pipe connection between and communicating with the hot and cold water pipes, valves in the ends of the cross-pipe for separately controlling the flow of hot and cold water thereinto, a neutral valve in the cross-pipe between the end valves, a neutral supply pipe leading from the neutral valve up to the bowl, sink or other point of delivery, and foot controlled means for operating the lower, neutral valve.

With the stated objects in view, and such other objects and advantages as may appear, a preferred construction of the invention is shown in the drawing as a part of the specification, and wherein.

Figure 3:
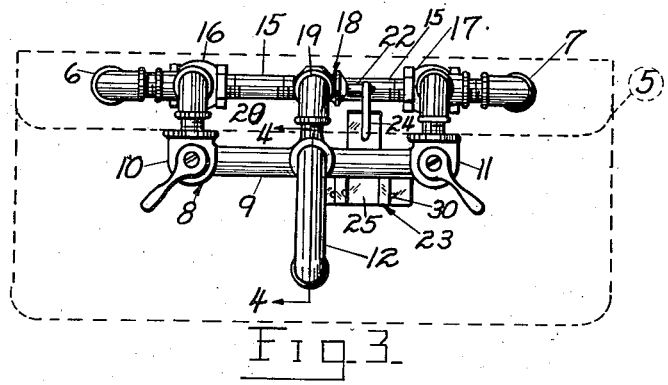
Figure 3 is a top view.
Figure 4:
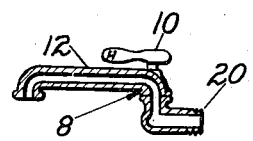
Figure 4 is a vertical longitudinal section through the combination faucet assembly and the additional neutral supply pipe, a part of the invention.
Figure 1:
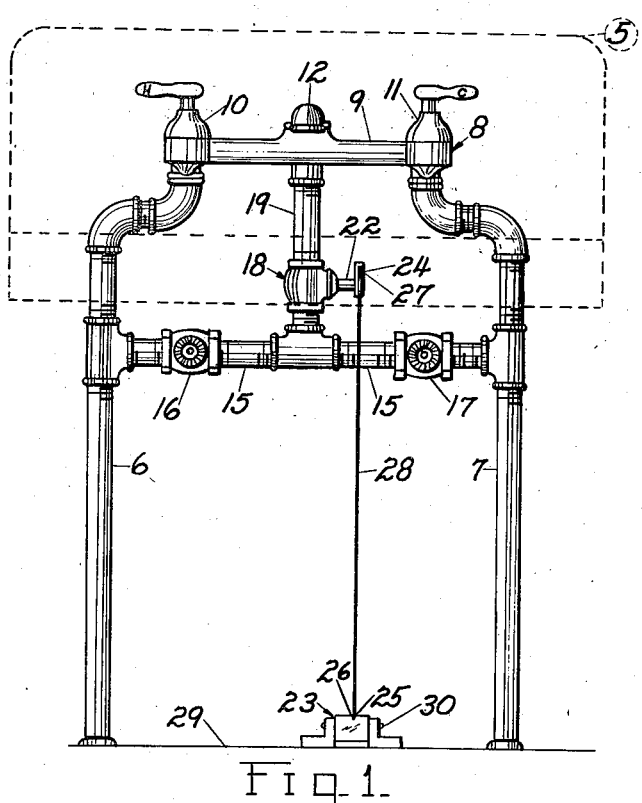
Figure 1 is a frontal elevation exemplifying the application of the invention to a kitchen sink supplied with hot and cold water through separate pipes and combination faucet, the sink being indicated in dotted lines.
Figure 2:
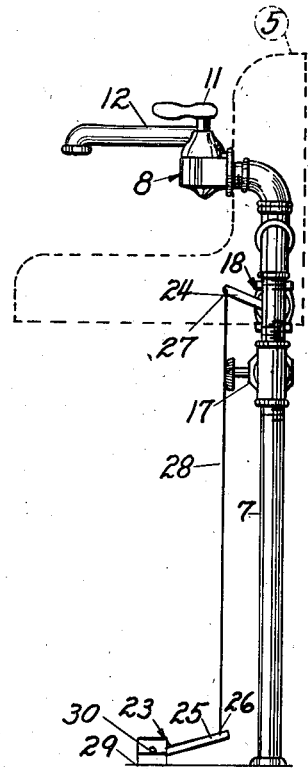
Figure 2 is a side elevation of the assembly of Figure 1.

In the drawing the invention is shown as applied to a conventional kitchen sink, indicated in dotted lines at 5, and which is supplied with hot and cold water through separate pipes 6 and 7 leading into a combination mixing faucet 8 including a short horizontal mixing pipe 9 into the ends of which the hot and cold pipes enter, valves 10 and 11 near the ends of the mixing pipe for controlling the flow of water therein to and from pipes 6 and 7, and a delivery spout 12 leading centrally from the mixing pipe 9, these being conventional structures.

The invention includes a communicating cross-pipe or mixing pipe connection 15 between the hot and cold water pipes 6 and 7, separate valves 16 and 17 at the ends of the cross-pipe for separately controlling the flow of water thereinto, a neutral valve assembly 18 seated in the mixing cross-pipe 15, a neutral supply pipe 19 leading from the neutral valve (and communicating through this valve with the mixing cross-pipe) to, and communicating centrally with, the mixing pipe 9 of the delivery faucet 8, as indicated at 20.

The valves 16 and 17 may be any conventional form of shut-off valve, such as a gate or globe valve. The neutral valve 18 is preferably some form of self-closing valve such as a rotary valve, spring-set to automatically close when released. With such form of rotary valve, the stem or shaft thereof being extended outwardly as shown at 22, a foot or pedal controlled means is provided, as indicated generally at 23. As here shown this means includes a crank-arm 24 rigidly joined at one end to the end of the valve stem 22 and extended outwardly or forwardly. This arm is so related to the action of the valve that downward movement of the arm serves to open the valve to flow of water through the pipe 19. A pedal 25 is then provided and is connected at one end as shown at 26 to the outer end of the arm 24, as shown at 27, by means of a cord or chain 28. The free or outer end of the pedal contacts the floor 29, being hinged thereto at 30, but the inner or attached end is supported somewhat above the floor in a conventional operative manner.

As here shown the mixing cross-pipe and valve assembly is located up under the sink so as to conceal same as much as possible, but the exact location is a matter of indifference so far as the operation of the device is concerned, and this assembly might be located medially or close to the floor, if desired. In lieu of the pedal and crank-arm as means for operating the valve 18, any other conventional foot control might be used.

With the construction shown and with the valve 18 closed, the combination faucet 8 may operate in usual manner. But where a steady or intermittent supply of water of a predetermined and fixed temperature is desired, this may be readily secured by manipulating the hot and cold water valves 16 and 17 so that the flow from pipes 6 and 7 into the mixing crosspipe 15 will be of the desired temperature as mixed in said pipe. When the pedal 25 is depressed, the valve 18 will open and this neutral water will flow through the valve 18, pipe 19 and faucet 8 for use in the sink or as desired, and as long as the pedal is depressed.

A particular embodiment and structural features of the invention are here shown and described, but the same may be varied within the scope of the appended claim. And while the invention is here shown as applied to an open sink, it may be readily adapted to a closed or cabinet sink, or to any other location.

I claim:

In a device of the kind described and embodying a combination water mixing faucet having hot and cold lead-in pipes connected thereto, a cross-pipe connected at its ends to the lead-in pipes, a foot-operated valve controlled supply pipe extending from said cross-pipe into said faucet and a valve in each portion of the cross-pipe between the lead-in pipes and the supply pipe.

CECELIA M. HACKLEY.